VOLTAGE DISCRIMINATING CIRCUIT

Filed April 23, 1957 3 Sheets-Sheet 1

INVENTOR
PAUL L. DI MATTEO
BY
[signature]
ATTORNEY

VOLTAGE DISCRIMINATING CIRCUIT

Filed April 23, 1957 3 Sheets-Sheet 2

INVENTOR
PAUL L. DI MATTEO
BY
[signature]
ATTORNEY

Oct. 11, 1960 P. L. DI MATTEO 2,956,158

VOLTAGE DISCRIMINATING CIRCUIT

Filed April 23, 1957 3 Sheets-Sheet 3

INVENTOR
PAUL L. DI MATTEO
BY
ATTORNEY

United States Patent Office 2,956,158

Patented Oct. 11, 1960

2,956,158

VOLTAGE DISCRIMINATING CIRCUIT

Paul L. Di Matteo, Levittown, N.Y., assignor to Sperry Rand Corporation, a corporation of Delaware Filed Apr. 23, 1957, Ser. No. 654,507

7 Claims. (Cl. 250—27)

This invention relates to an electrical circuit which will discriminate with respect to the input voltage in such a manner as to provide an output only when the input voltage is within a predetermined voltage amplitude range.

The invention permits the transmission of intelligence in the form of an output current or voltage for only a predetermined range of the input voltage. The output intelligence may be transmitted in the form of a number of different types of wave shapes, including trapezoidal, square or triangular. Further, the phase of the transmitted intelligence wave form can be reversed by a predetermined shift in the D.C. level of the input signal.

The circuit of the present invention is inherently versatile to the extent that the output intelligence is only a function of the design parameters of the circuitry and the components utilized therein. It has no limitations other than those imposed by the limitations of the components themselves and does not require additional components to obtain the desired variations in the output intelligence. Thus, the voltage amplitude limits over which the circuit will operate and the magnitude, wave shape, frequency response and phase of the output intelligence are determined by the selection of the circuit components necessary to achieve the desired results.

When a multiplicity of the circuits of the present invention are adapted for voltage amplitude discrimination for switching purposes, the switching sequence can be in any order desired and is triggered by the amplitude of the input voltage signal thus eliminating the need for sequential operation. For each output lead desired, in multiple operation, a different output tube can be adapted to match the external circuit as may be required. The intelligence from either of two sources can be selected for transmission over any one lead by the appropriate shift in the D.C. voltage applied to the lead; one of these sources must be the input lead.

The circuit of the present invention is described, for purposes of example, with respect to an output tube in the form of a triode. The identical principle is adaptable to electronic discharge device of all types, including multi-grid vacuum tubes, gas tubes, and transistors. When using multi-grid tubes, the invention has an additional feature of enabling gating voltages or intelligence signals to be applied to either the suppressor or screen grid or both. Coincidence gating is easily introduced on either the suppressor or screen grid as the circuit has a built-in gating provision. If pentodes are used with an external suppressor lead, two gating pulses may be employed, one on the screen, the other on the suppressor grid.

Accordingly, an object of this invention is to provide a novel versatile voltage discriminating circuit adaptable because of the versatility of its output to a number of applications.

A further object of the present invention is to provide a circuit which is adaptable for use such as a voltage discriminator, wave generator and/or phase shifter.

It is an additional object of the present invention to provide a circuit which will produce an output only when the input voltage is within a predetermined range.

These and other objects of the present invention, which will become apparent as the description proceeds, are achieved by a circuit having an electronic discharge device that has an electron emitting electrode connected to ground potential, at least one control electrode and an electron collecting electrode. The electronic discharge device is connected to a suitable power supply. The control electrode is adapted to receive the input signal and has connected thereto a first means for maintaining the potential of the control electrode below a predetermined magnitude. Connected to the electron emitting electrode is a second means for varying the potential thereof in accordance with input signals above a predetermined magnitude. When the input signal is between the limits determined by said first and second means, the electronic discharge device provides an output signal that may transmit intelligence to another circuit or may energize a load member coupled to said electronic discharge device.

For further objects and advantages, and for a better understanding of the invention, attention is now directed to the drawings wherein like reference characters indicate like elements:

The present invention is applied to a vacuum tube circuit, for purposes of example, utilizing a triode which will permit an output signal for only a predetermined range of input voltage. If desired, the circuit may be adapted to operate for a very narrow input voltage range about any distinct voltage input level. For purposes of illustration, the graphs showing the operation of the present invention have been drawn based upon the input signal, $E_1$, being supplied from a low impedance source.

Figures 1, 2, 3, 4, 5, 6:
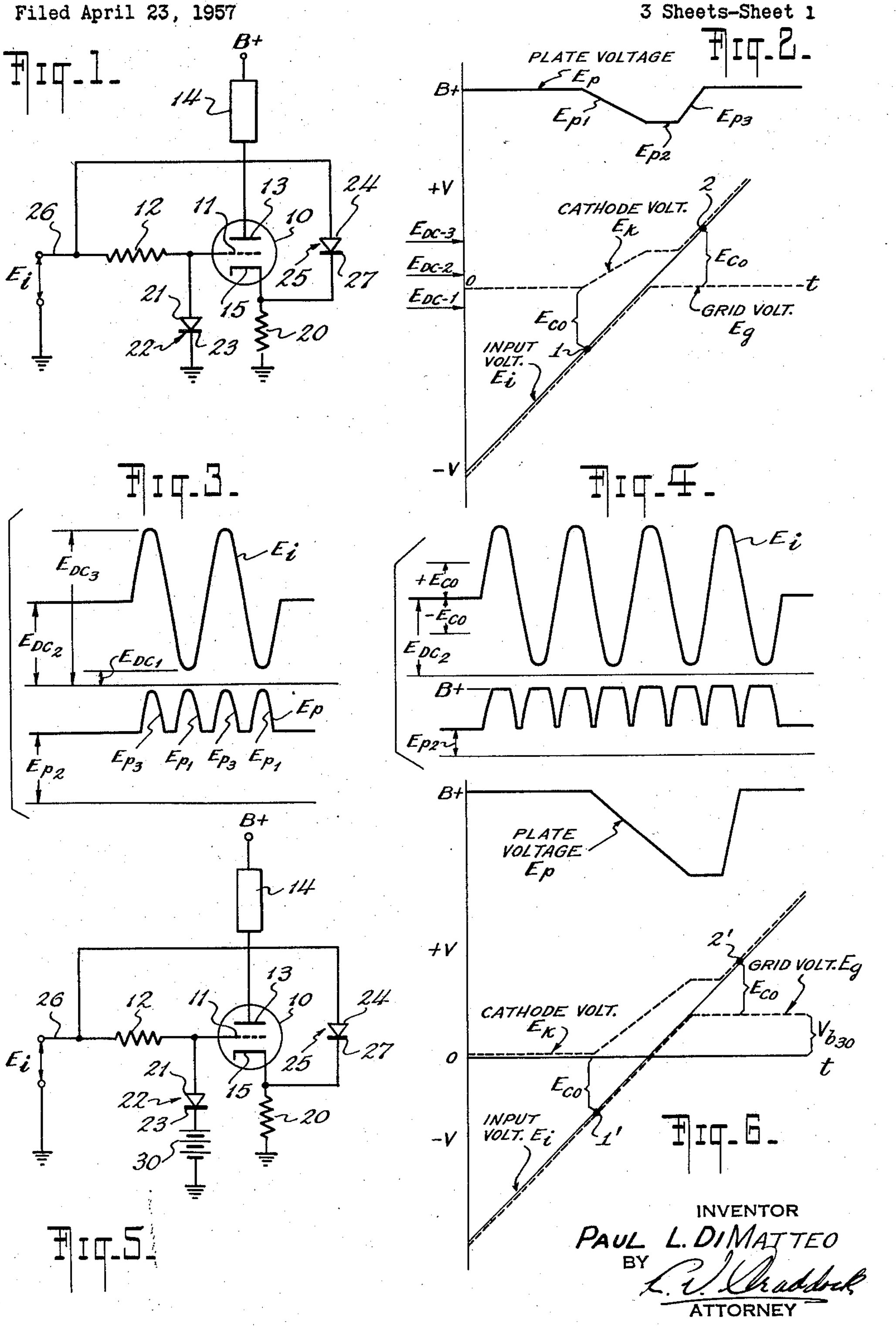
Fig. 1 is a schematic wiring diagram of a preferred embodiment of the present invention.
Fig. 2 is a graph showing the voltage operating characteristics for the circuit of Fig. 1.
Fig. 3 is a graph illustrating the relationship between the input voltage waveform and the output voltage waveform of the circuit of Fig. 1.
Fig. 4 is another graph illustrating the relationship between the input voltage signal and the output voltage signal of the circuit of Fig. 1.
Fig. 5 is a schematic wiring diagram of an alternative embodiment of the invention.
Fig. 6 is a graph showing the voltage operating characteristics for the circuit of Fig. 5.

A preferred embodiment of this circuit in its basic form is indicated in Fig. 1 wherein an electronic discharge device in the form of a triode 10 has a control grid 11 adapted to receive an input signal, $E_1$, through a grid resistor 12. The plate 13 of triode 10 is connected through a load member 14 which may be a relay, resistor or other suitable load device to a suitable source of positive potential indicated as B+. The cathode 15 of triode 10 is connected to ground potential through a suitable biasing resistor 20. The plate 21 of a first unilateral conducting device in the form of rectifier or diode 22 is connected at the junction of grid resistor 12 and control grid 11. The cathode 23 of diode 22 is connected to ground potential. The plate 24 of a second unilateral conducting device in the form of a second rectifier or diode 25 is connected to input lead 26 ahead of grid resistor 12. The cathode 27 of diode 25 is connected at the junction of the cathode 15 of triode 10 and biasing resistor 20.

In the operation of the circuit shown in Fig. 1, with a negative input signal voltage, $E_i$, diodes 22 and 25 do not conduct since there is a negative voltage on their plates 21 and 24, respectively. As shown in Fig. 2, when the input signal voltage, $E_i$, is negative and at a value below the cutoff value, $E_{co}$, of the triode 10, the grid 11 of triode 10 is beyond cutoff with the triode 10 in a nonconducting state and with the load member 14 unenergized. The cathode voltage, $E_k$, is zero or ground potential while the plate voltage $E_p$ is at B+.

When the input signal voltage, $E_i$, increases to the point where the grid voltage, $E_g$, is equal to minus $E_{co}$, as shown at point 1 on the graph, the triode 10 starts to conduct. As the grid voltage, $E_g$, increases with the increasing input voltage, $E_i$, the grid 11 becomes less negative with respect to the cathode 15, the plate current through triode 10 increases and the cathode voltage, $E_k$, follows the applied input voltage, $E_i$. The plate voltage, $E_p$, is decreasing proportionately.

When the input voltage $E_i$, goes positive, diode 22 conducts thereby clamping the potential on grid 11 to ground as the grid resistor 12 is chosen to be large with respect to the resistance of diode 22. Thus, although the input voltage $E_i$ continues to rise, the grid voltage $E_g$ remains constant. The plate current flowing through triode 10, the cathode voltage $E_k$ and the plate voltage $E_p$ all remain constant.

When the input voltage $E_i$ begins to exceed the cathode voltage $E_k$, diode 25 will conduct. Assuming zero forward resistance for the diode 25, the cathode voltage $E_k$ then follows the applied input voltage $E_i$ directly.

The cathode voltage $E_k$, by increasing with the applied input voltage $E_i$, reaches a positive voltage with respect to the grid voltage $E_g$, which has remained clamped at ground potential, sufficient to cut off the triode 10. After this point, indicated at 2 on the graph of Fig. 2, assuming the input voltage $E_i$ continues to increase, the cathode voltage $E_k$ will increase accordingly, thus making the grid 11 continually more negative with respect to the positive going cathode 15, thereby precluding further conduction of the triode 10.

From the above description, it can be seen that the circuit of the present invention discriminates with respect to voltage in the sense that for only a predetermined voltage range will the plate current in triode 10 flow and thereby energize the load member 14 or provide an output signal.

The plate circuit load member 14 could be a relay, resistor, neon lamp or any other element capable of yielding an indication of current flow. Alternatively, the circuit is adaptable to provide an output signal of a predetermined waveform which might be utilized in computers, telemetering apparatus or other applications where a predetermined wave shape is desirable. The circuit is also adaptable to provide an output signal waveform that can be triangular in shape rather than trapezoidal or square.

Referring again to Fig. 2, for a D.C. voltage input of $E_{dc1}$, the corresponding plate voltage will be $E_{p1}$. Likewise, for D.C. voltage input levels of $E_{dc2}$ and $E_{dc3}$, the corresponding plate voltages will be $E_{p2}$ and $E_{p3}$. With a very small A.C. signal, such as a sine wave superimposed on $E_{dc1}$, the phase of the plate voltage signal (for a pure resistive load) will be 180 degrees out of phase with respect to the input A.C. signal since the grid voltage is the controlling factor during this interval. If the A.C. signal were superimposed on $E_{dc2}$, there would be no A.C. signal present in the plate voltage at all, since the A.C. signal would be shorted to ground through the conducting diode 21 and since diode 25 is open thereby preventing the A.C. signal from being applied to the cathode 15. If the A.C. signal were superimposed on $E_{dc3}$, the phase of the plate voltage signal would be in phase with the input signal. Therefore, with small changes in the D.C. level of the input signal, the output of the circuit of the present invention can have an A.C. signal component that is either out of phase or in phase with the input signal multiplied by the gain of the tube. In addition, the A.C. signal component can be made to disappear.

Referring to Fig. 3, for a D.C. voltage input level of $E_{dc2}$, upon which an A.C. signal, such as a sine wave, is superimposed whose positive and negative peak amplitudes are such that they extend to $E_{dc3}$ and $E_{dc1}$, respectively, the output voltage waveform will approach that of full wave detection as indicated in Fig. 3, which illustrates the relationship between the input voltage signal $E_i$ and the plate voltage waveform $E_p$.

As illustrated in Fig. 4, if an A.C. signal, whose positive and negative peak amplitudes are greater than plus and minus $E_{co}$, respectively, is superimposed on an input D.C. voltage level of $E_{dc2}$, then the output voltage at the plate 13 of triode 10 would be limited during the interval when the instantaneous input voltage levels exceed plus and minus $E_{co}$. The limiting would be essentially symmetrical with respect to the zero point of the A.C. signal.

To permit the circuit of the present invention to operate at any other potential (either positive or negative) other than about zero input volts, the grounded end of cathode resistor 20 and the cathode 23 of diode 22 should be returned to the desired potential rather than to ground potential. Alternatively, the voltage level about which the circuit discriminates can be changed by returning the cathode resistor 20 and diode 22 to different voltage levels, other than ground potential. This may be accomplished, for example, by connecting positive or negative biasing means, such as batteries, between the diode 22 and ground and/or between the resistor 20 and ground or any other combination thereof. Thus, the voltage range to which the circuit is responsive can be made narrower by returning the diode 22 to a more negative voltage or, conversely, made wider by returning diode 22 to a more positive voltage.

An alternative embodiment of the circuit of Fig. 1 to extend the range of input voltage at which condition will occur is indicated in Fig. 5. In the circuit of Fig. 5, battery 30 is connected between the cathode 23 of diode 22 and ground to positively bias diode 22 thereby raising the input potential at which diode 22 will conduct. The resulting voltage relation is shown in Fig. 6. Now conduction will occur for any input voltage level between the extended points 1' and 2'. Point 2' of Fig. 6 has been extended by a function of the magnitude of the positive potential of battery 30, $V_{b30}$ as indicated in Fig. 6.

Figure 7:
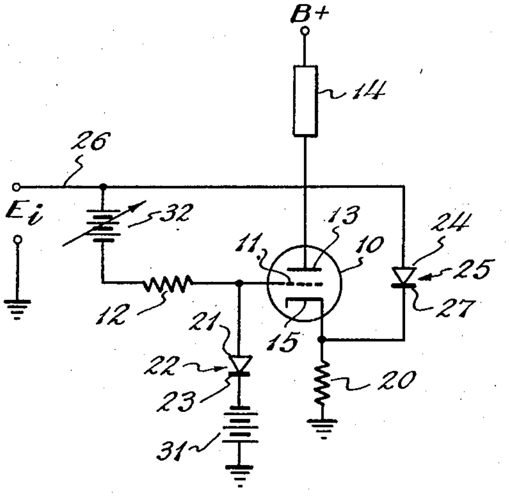
Fig. 7 is a schematic wiring diagram of another alternative embodiment of the invention.
Figure 8:
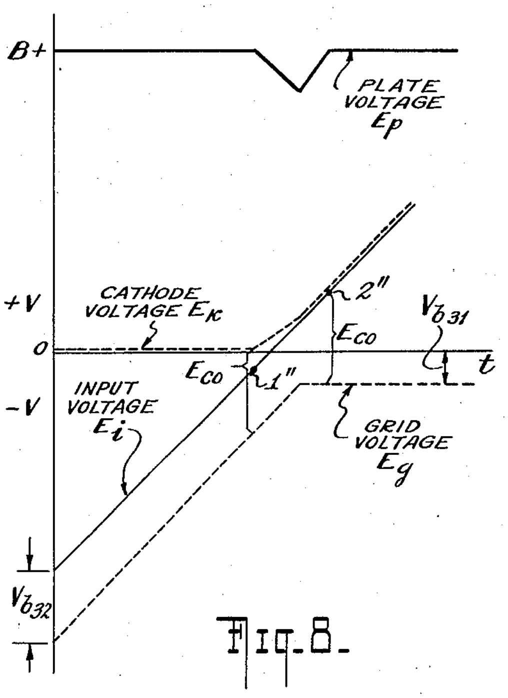
Fig. 8 is a graph showing the voltage operating characteristics for the circuit of Fig. 7.

Conversely, to narrow the range of input voltage over which conduction will occur, the circuit of Fig. 1 may be revised as indicated in Fig. 7. In this circuit, battery 31 is connected between the cathode 23 of diode 22 and ground to negatively bias diode 22 thereby enabling diode 22 to conduct at a lower negative potential. Connected between the input connection 26 to diode 25 and grid resistor 12 is a source of variable potential 32 adapted to lower the potential, relative to the input voltage $E_i$, at which diode 22 will conduct. Variation of the potential of source 32 will enable the range of input voltage over which conduction will occur to be as narrow as desired. The resulting voltage relation plot is shown in Fig. 8. Now conduction will occur for any input voltage level between the narrowed voltage range indicated by points $1''$ and $2''$ in Fig. 8, depending upon the magnitude of the potential of battery 31, $V_{b31}$, and source 32 $V_{b32}$.

Figure 9:
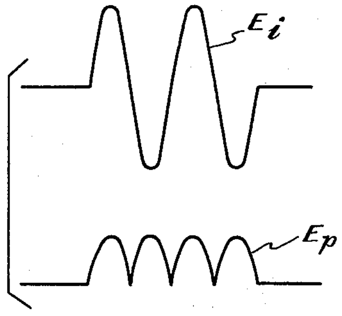
Fig. 9 is a graph illustrating the relationship between the input voltage waveform and the output voltage waveform of the circuit of Fig. 7.

For a circuit arrangement, similar to that shown in Fig. 7, it is possible to obtain full wave rectification that completely inverts the entire negative half of the input A.C. signal and reproduces the entire positive half of the input A.C. signal. By superimposing an A.C. input signal on a D.C. level equal to $V_{b31}$, as shown in Fig. 8, the negative half of the A.C. input signal will produce an inverted A.C. output signal in the plate circuit while the positive half of the A.C. input signal will be in phase with the A.C. output signal in the plate circuit due to the triangular characteristic of the plate voltage under the D.C. conditions of Fig. 8. Fig. 9 indicates the output waveform $E_p$ having this property.

If the circuit of Fig. 1 is altered such that instead of returning the bottom of cathode resistor 20 to ground and the cathode 23 of diode 22 to ground, they are returned to some other potential, $E_{b1}$, then plate current would flow for a different range of input voltage $\Delta E_{i1}$ than that which would produce plate current flow when they were connected to ground.

Figures 10, 11:
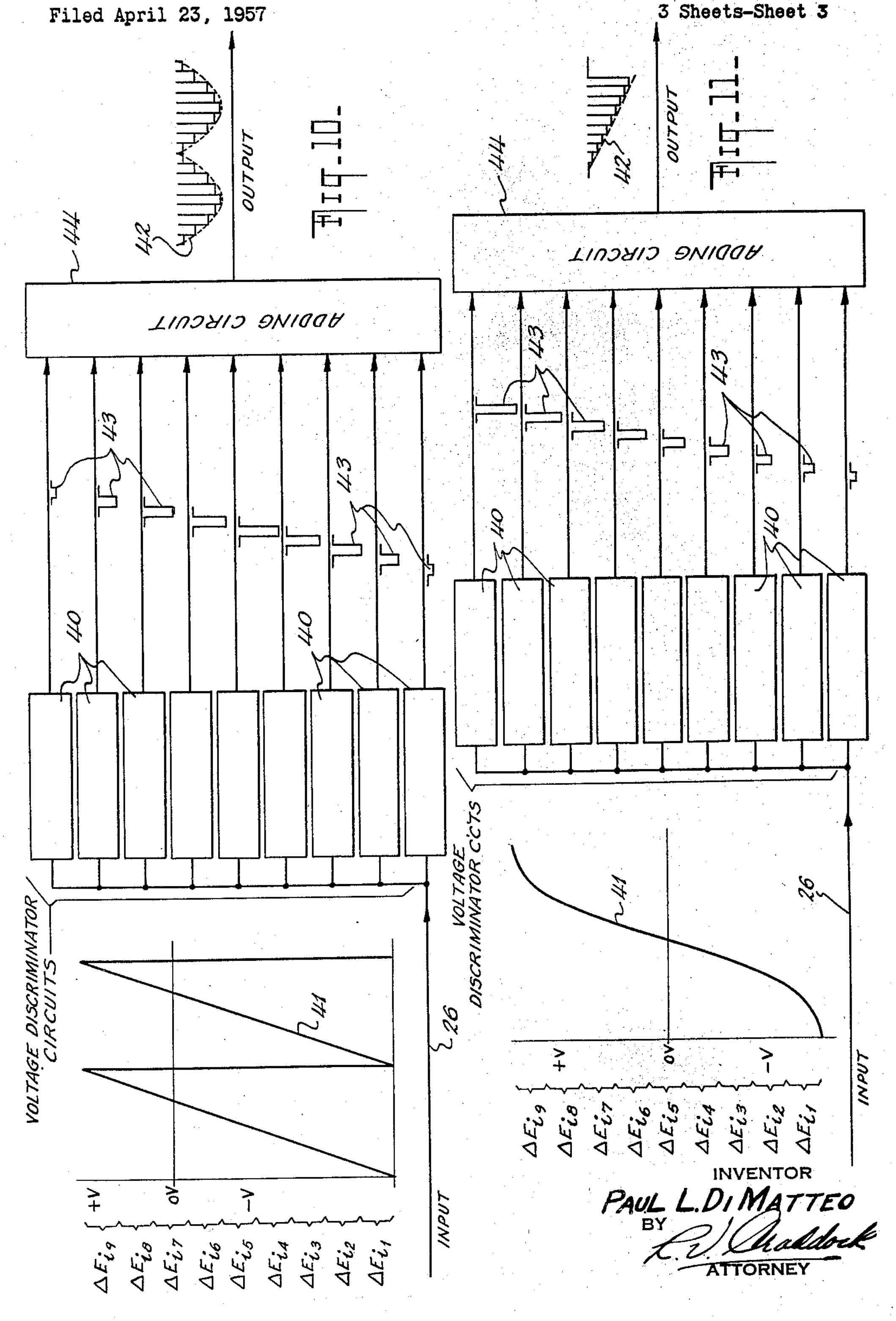
Fig. 10 is a block diagram of a plurality of voltage discriminating circuits of the present invention adapted to receive a sawtooth input wave.
Fig. 11 is a block diagram similar to Fig. 10 with a non-linear input wave.

For example, as shown in Fig. 10, by connecting together the input connections 26 of a plurality of voltage discriminating circuits 40 of the general character described in Fig. 1, and by returning each of the cathode resistors 20 and each of the cathodes 23 of diodes 22 therein to different voltage levels $E_{b1}$, $E_{b2}$, $E_{b3}$—$E_{bn}$ then each of the circuits 40 would be responsive to a distinct input voltage range and in combination there would exist distinct input voltage ranges $\Delta E_{i1}$, $\Delta E_{i2}$, $\Delta E_{i3}$—$\Delta E_{in}$ for which plate current would flow in each of the respective plate circuits during the time the circuits 40 were responsive thereto.

By the proper selection of $E_{b1}$, $E_{b2}$, $E_{b3}$—$E_{bn}$, the input voltage range interval $\Delta E_{i1}$, $\Delta E_{i2}$, $\Delta E_{i3}$—$\Delta E_{in}$, during which the respective plate currents $I_{b1}$, $I_{b2}$, $I_{b3}$—$I_{bn}$ of circuits 40 will flow is determinable, hence they can be made to overlap, be adjacent or be spaced as desired. Further, by using different values for the individual plate loads 14 (i.e. resistance, inductance, tuned circuit, etc.) different values of $E_{p1}$, $E_{p2}$, $E_{p3}$—$E_{pn}$ can be obtained during the interim when the particular circuit is in its conduction interval. If the common input voltage is varied from a value that is more negative than the extreme negative limit of $\Delta E_{i1}$ to a value more positive than $\Delta E_{in}$ (assuming $\Delta_{i1}$, $\Delta E_{i2}$, $\Delta E_{i3}$—$\Delta E_{in}$ were in an increasingly positive direction) then the plate voltages of the respective circuits 40 would each drop to a different value depending upon the value of the plate load. Therefore, the output pulse 43 from each of the circuits 40 is controllable as to time relation and amplitude by either the adjustment or selection of the individual plate load impedance in each of the circuits 40. By feeding the individual output pulses 43 from circuits 40 into an adding circuit 44, the output waveform 42 from the adding circuit 44 is the composite sum of the individual pulses 43. By controlling the amplitudes of the individual pulses 43, the resulting output waveform 42 from the adding circuit 44 is also controllable. The input waveform 41 need not be a linearly increasing voltage. The aforementioned circuit arrangement makes it possible to take a non-linear input waveform and create a linear output waveform. The input waveform may be shaped providing the slope of the input waveform does not reverse or does not equal zero in the region where it is to be shaped.

The block diagram of Fig. 10 illustrates the basic form that the aforementioned combined circuits may take with an illustrative input and output waveform. In Fig. 10, a half sine wave output 42 was obtained for a linear saw-tooth input 41; however, it can be seen from the above that any output waveform 42 desired can be obtained by the proper choice of plate loads 14 (shown in Fig. 1) for each of the individual voltage discriminator circuits 40. The resolution of the output waveform 42 can be as fine as desired by increasing the number of individual voltage discriminator circuits 40 and increasing the amplitude of the input waveform 41.

Fig. 11 illustrates how the circuits 40 may be arranged to produce a linear output waveform 42 for a non-linear input waveform 41. Here again the output waveform 42 could be of any form desired and the resolution is only a function of how many individual voltage discriminator circuits 40 are used.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. An amplitude discriminating circuit comprising an input connection adapted to receive an input signal, said input signal being susceptible of amplitude variations, a biasing resistor, biasing means, an electronic discharge device having a first electron emitting electrode connected to a point of ground potential through said biasing resistor and said biasing means, a first control electrode and a first electron collecting electrode, a grid resistor having one end connected to said input connection and the other end connected to said first control electrode, a power supply, a load, said first collecting electrode being connected to said power supply through said load member, a first unilateral conducting device having a second electron emitting electrode connected to a point of ground potential and a second electron collecting electrode connected between said grid resistor and said first control electrode, and a second unilateral conducting device having a third electron emitting electrode connected between said biasing resistor and said first electron emitting electrode and a third electron collecting electrode adapted to receive said input signal whereby the electronic discharge device provides an output only when the amplitude of the input signal is within a predetermined range.

2. An amplitude discriminating circuit comprising an input connection adapted to receive an input signal, said input signal being susceptible of amplitude variations, a biasing resistor, an electron discharge device having a first electron emitting electrode connected to a point of predetermined potential through said biasing resistor, a first control electrode and a first electron collecting electrode, a grid resistor having one end connected to said input connection and the other end connected to said first control electrode, a load member, said first collecting electrode being connected to said load member, biasing means, a first unilateral conducting device having a second electron emitting electrode connected to a point of predetermined potential through said biasing means and a second electron collecting electrode connected between said grid resistor and said first control electrode, and a second unilateral conducting device having a third electron emitting electrode connected between said biasing resistor and said first electron emitting electrode and a third electron collecting electrode adapted to receive said input signal whereby the electronic discharge device provides an output only when the amplitude of the input signal is within a predetermined range.

3. An amplitude discriminating circuit comprising an input connection adapted to receive an input signal, said input signal being susceptible of amplitude variations, a biasing resistor, first biasing means, an electronic discharge device having a first electron emitting electrode connected to a point of predetermined potential through said biasing resistor and said first biasing means, a first control electrode and a first electron collecting electrode connected to provide an output signal, a grid resistor having one end connected to said input connection and the other end connected to said first control electrode, second biasing means, a first unilateral conducting device having a second electron emitting electrode connected to a point of predetermined potential through said second biasing means and a second electron collecting electrode connected between said grid resistor and said first control electrode, and a second unilateral conducting device having a third electron emitting electrode connected between said biasing resistor and said first electron emitting electrode and a third electron collecting electrode adapted to receive said input signal whereby the electronic discharge device provides an output only when the amplitude of the input signal is within a predetermined range.

4. In combination, an input connection adapted to receive an input signal, an electron discharge device having first and second input terminals and an output terminal, a first impedance, said first input terminal being connected through said first impedance to said input connection, a second impedance, said second input terminal being connected through said second impedance to a point of predetermined potential, a power source, said output terminal being connected to said power source to provide an output signal, means including a first rectifier connected to said first input terminal and to a point of predetermined potential and so poled as to conduct input signals above a predetermined amplitude from said first input terminal to a point of predetermined potential, means including a second rectifier connected to said input connection and to said second input terminal and so poled as to conduct input signals above a predetermined amplitude from said input connection to said second input terminal, whereby an output signal is provided only when the amplitude of the input signal is within a predetermined range.

5. In combination, an input connection adapted to receive an input signal, an electron discharge device having a cathode, a grid and an anode, a first impedance having one end connected to said input connection and the other end connected to said grid, a second impedance having one end connected to said cathode and the other end connected to a point of ground potential, a first rectifier connected to said grid and to a point of ground potential and so poled as to conduct positive input signals from said grid to said point of ground potential, a second rectifier connected to said input connection and to said cathode and so poled as to conduct positive input signals above a predetermined magnitude from the input connection to the cathode, a power source, and a load, said anode being connected to said power source through said load whereby said device provides an output only when the amplitude of the input signal is within a predetermined range.

6. A voltage discriminating circuit comprising an input connection adapted to receive an input signal, said input signal being susceptible of amplitude variations above and below a predetermined potential, an electron discharge device having a cathode, a grid and an anode, a first resistor having one end connected to said input connection and the other end connected to said grid, a second resistor having one end connected to said cathode and the other end connected to a point of predetermined potential, a first diode having its anode connected to said grid and its cathode connected to a point of predetermined potential, a second diode having its anode connected to said input connection and its cathode connected to the cathode of said device, a power source, and a load, the anode of said device being connected to said power source through said load whereby said device provides an output only when the amplitude of the input signal is within a predetermined range.

7. A circuit of the character described with respect to claim 2 including a source of variable potential connected between said input connection and said grid resistor.

References Cited in the file of this patent

UNITED STATES PATENTS

| | | |
|---|---|---|
| 2,240,289 | Dillenburger et al. | Apr. 29, 1941 |
| 2,248,793 | Terry | July 8, 1941 |
| 2,469,860 | Cockrell | May 10, 1949 |
| 2,509,742 | Mynall | May 30, 1950 |
| 2,518,341 | Libois | Aug. 8, 1950 |
| 2,609,529 | Lesti | Sept. 2, 1952 |
| 2,798,153 | Dougherty et al. | July 2, 1957 |
| 2,822,470 | Imm | Feb. 4, 1958 |
| 2,850,646 | Ingham | Sept. 2, 1958 |